United States Patent [19]
Aoyagi et al.

[11] Patent Number: 5,570,249
[45] Date of Patent: *Oct. 29, 1996

[54] TRANSDUCER SUSPENSION SYSTEM

[75] Inventors: Akihiko Aoyagi, Kanagawa-ken, Japan; Oscar J. Ruiz, San Jose, Calif.

[73] Assignee: International Business Machines Corporation

[ * ] Notice: The term of this patent shall not extend beyond the expiration date of Pat. No. 5,526,205.

[21] Appl. No.: 516,675

[22] Filed: Aug. 18, 1995

Related U.S. Application Data

[63] Continuation of Ser. No. 298,475, Aug. 29, 1994, Pat. No. 5,526,205.

[51] Int. Cl.[6] .............................. G11B 5/68; G11B 21/16; G11B 5/54; G11B 5/55
[52] U.S. Cl. .......................... 360/104; 360/106; 360/107
[58] Field of Search ...................................... 360/103, 104

[56] References Cited

U.S. PATENT DOCUMENTS

| | | | |
|---|---|---|---|
| 4,167,765 | 9/1979 | Watrous | 360/103 |
| 4,797,763 | 1/1989 | Levy et al. | 360/104 |
| 5,138,507 | 8/1992 | Zarouri et al. | 360/104 |
| 5,187,625 | 2/1993 | Blaeser et al. | 360/104 |
| 5,208,712 | 5/1993 | Hatch et al. | 360/98.01 |
| 5,299,081 | 3/1994 | Hatch et al. | 360/104 |
| 5,321,568 | 6/1994 | Hatam-Tabrizi | 360/106 |

FOREIGN PATENT DOCUMENTS

| | | |
|---|---|---|
| 487914A2 | 10/1991 | European Pat. Off. . |
| 59-207065 | 11/1984 | Japan . |
| 4-321918 | 11/1992 | Japan . |

*Primary Examiner*—John H. Wolff
*Assistant Examiner*—A. Giordana
*Attorney, Agent, or Firm*—Douglas R. Millett

[57] ABSTRACT

A suspension system comprises a load beam and a flexible member. The load beam has an elongated stamped concave section. The flexible member is attached to the load beam such that a portion of the flexible member encloses the concave section of the load beam. The flexure has an aperture with a tongue section. The tongue section is offset by a "v" shaped bend. A transducer assembly is attached to the tongue section.

29 Claims, 6 Drawing Sheets

5,570,249

TRANSDUCER SUSPENSION SYSTEM

This is a continuation application of U.S. patent application Ser. No. 08/298,475 filed Aug. 29, 1994 now Pat. No. 5,526,205.

BACKGROUND OF THE INVENTION

1. Field of the Invention

This invention relates generally to transducer suspension systems and more particularly to a suspension system having a low profile.

2. Description of the Prior Art

Direct access storage devices (DASD), or disk drives, store information on concentric tracks of a rotatable magnetic recording disk. A magnetic head or transducer element is moved from track to track to record and read the desired information. Typically, the magnetic head is positioned on an air bearing slider which flies above the surface of the disk as the disk rotates. In some recently proposed disk drives, the slider (or carrier) rides on a liquid film or bearing on the disk. A suspension assembly connects the slider to a rotary or linear actuator. The suspension provides support for the slider.

The suspension must meet several requirements. The suspension must be flexible and provide a bias force in the vertical direction. This is necessary to provide a compensating force to the lifting force of the air bearing in order to keep the slider at the correct height above the disk. Also, the vertical flexibility is needed to allow the slider to be loaded and unloaded away from the disk. Another requirement of the suspension is that it must provide a pivotal connection for the slider. Irregularities in manufacture and operation may result in misalignment of the slider. The slider is able to compensate for these problems by pitching and/or rolling slightly to maintain the air bearing. Another requirement of the suspension is that it must be rigid in the lateral direction. This is needed to prevent the head from moving side to side, which would result in the head reading the wrong track.

Examples of suspension systems are shown in the following references: U.S. Pat. No. 4,167,765, issued Sep. 11, 1979 to Watrous; U.S. Pat. No. 4,797,763, issued Jan. 10, 1989 to Levy et al; U.S. Pat. No. 5,187,625, issued Feb. 16, 1993 to Blaeser et al; U.S. Pat. No. 5,208,712, issued May 4, 1993 to Hatch et al; European Patent Application 0487914 published Oct. 29, 1991 by Foote, et al; Japanese Patent Application 59-207065, published Nov. 24, 1984 by Hashimoto; and Japanese Patent Application 04-321918, published Nov. 11, 1992 by Yamazaki.

Disk drives have become smaller in size while at the same time the data storage capacity has greatly increased. Large capacity disk drives typically have multiple disks mounted on the same rotatable spindle. In order to accommodate more disks in the same height, the space between each disk must be greatly decreased. Also, disk drives having only a single disk may have limited space to accommodate a suspension between the disk and an outer housing. The height of the suspension has proven to be a limiting factor in realizing closer disk spacing and smaller disk drives. What is needed is a suspension system which has a very low profile, meets the performance requirements, and is inexpensive to manufacture.

SUMMARY OF THE INVENTION

Briefly, in a preferred embodiment of the present invention, a suspension system comprises a load beam and a flexible member. The load beam has a stamped concave section. The flexible member is attached to the load beam such that a portion of the flexible member encloses the concave section of the load beam. The resulting box structure provides rigidity to the load beam.

The flexible member has a tongue section which receives a transducer assembly. The tongue section has two bend lines such that the tongue section is offset from the rest of the flexible member. The bend lines are "v" shaped in order to keep the transducer assembly in the proper orientation.

For a fuller understanding of the nature and advantages of the present invention, reference should be made to the following detailed description taken in conjunction with the accompanying drawings.

DESCRIPTION OF THE PREFERRED EMBODIMENTS

Figure 1:
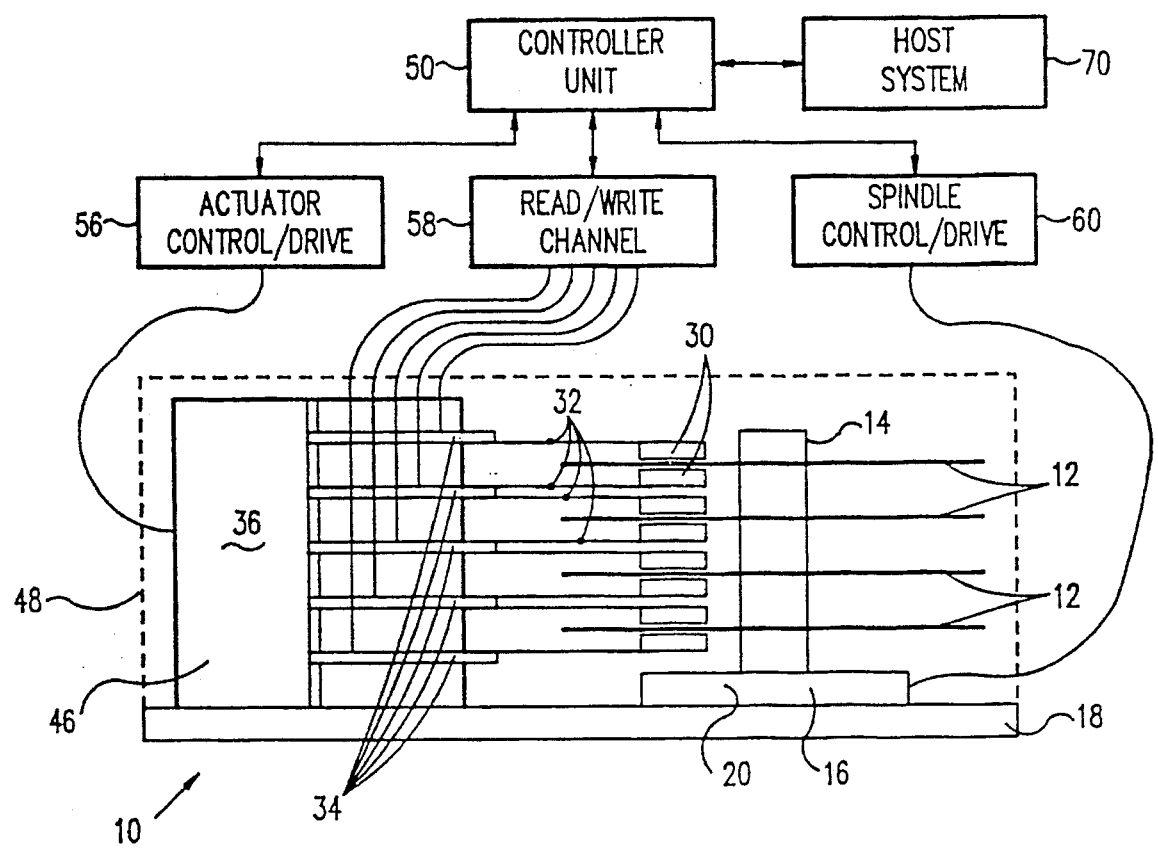
FIG. 1 is a schematic diagram of a data storage system of the present invention.

FIG. 1 shows a schematic diagram of a data storage system of the present invention and is designated by the general reference number 10. System 10 comprises a plurality of magnetic recording disks 12. Each disk has a plurality of concentric data tracks. Disks 12 are mounted on a spindle motor shaft 14 which is connected to a spindle motor 16. Motor 16 is mounted to a chassis 18. The disks 12, spindle 14, and motor 16 comprise a disk stack assembly 20.

A plurality of read/write heads 30 are positioned over the disks 12 such that each surface of the disks 12 have a corresponding head 30. Each head 30 is attached to one of the plurality of suspensions 32 which in turn are attached to a plurality of actuator arms 34. Arms 34 are connected to a rotary actuator 36. Alternatively, the arms 34 may be an integral part of a rotary actuator comb. Actuator 36 moves the heads in a radial direction across disks 12. Actuator 36 typically comprises a rotating member 38 mounted to a rotating bearing 40, a motor winding 42 and motor magnets 44. Actuator 36 is also mounted to chassis 18. Although a rotary actuator is shown in the preferred embodiment, a linear actuator could also be used. The heads 30, suspensions 32, arms 34, and actuator 36 comprise an actuator assembly 46. The disk stack assembly 20 and the actuator assembly 46 are sealed in an enclosure 48 (shown by dashed line) which provides protection from particulate contamination.

A controller unit 50 provides overall control to system 10. Controller unit 50 typically contains a central processing unit (CPU), memory unit and other digital circuitry. Controller 50 is connected to an actuator control/drive unit 56 which in turn is connected to actuator 36. This allows controller 50 to control the movement of heads 30 over disks 12. The controller 50 is connected to a read/write channel 58 which in turn is connected to the heads 30. This allows controller 50 to send and receive data from the disks 12. Controller 50 is connected to a spindle control/drive unit 60 which in turn is connected to spindle motor 16. This allows controller 50 to control the rotation of disks 12. A host system 70, which is typically a computer system, is connected to the controller unit 50. System 70 may send digital data to controller 50 to be stored on disks 12, or may request that digital data be read from disks 12 and sent to the system 70. The basic operation of DASD units is well known in the art and is described in more detail in *Magnetic Recording Handbook*, C. Dennis Mee and Eric D. Daniel, McGraw—Hill Book Company, 1990.

Figure 2:
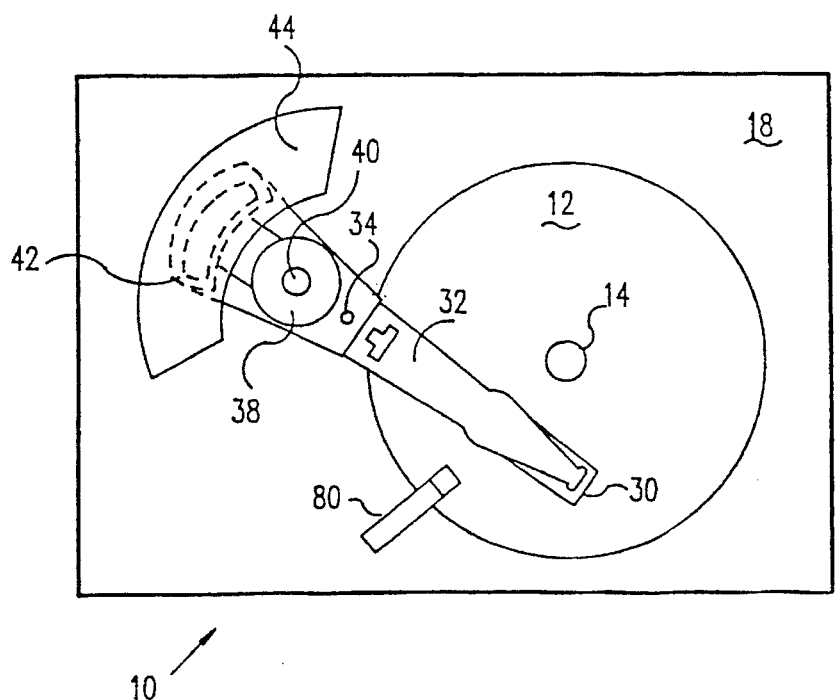
FIG. 2 is a top view of the system of FIG. 1.

FIG. 2 shows top view of system 10. A loading ramp member 80 is located at the edge of the disk stack assembly 20. Member 80 automatically unloads the heads 30 from the disks 12 as actuator 36 moves the heads 30 to the outer disk position. To unload a head means to move it a vertical distance away from its corresponding disk surface. The ramp 80 is optional. Alternatively, the heads 30 may be placed permanently in the loaded position between the disks.

Figure 3:
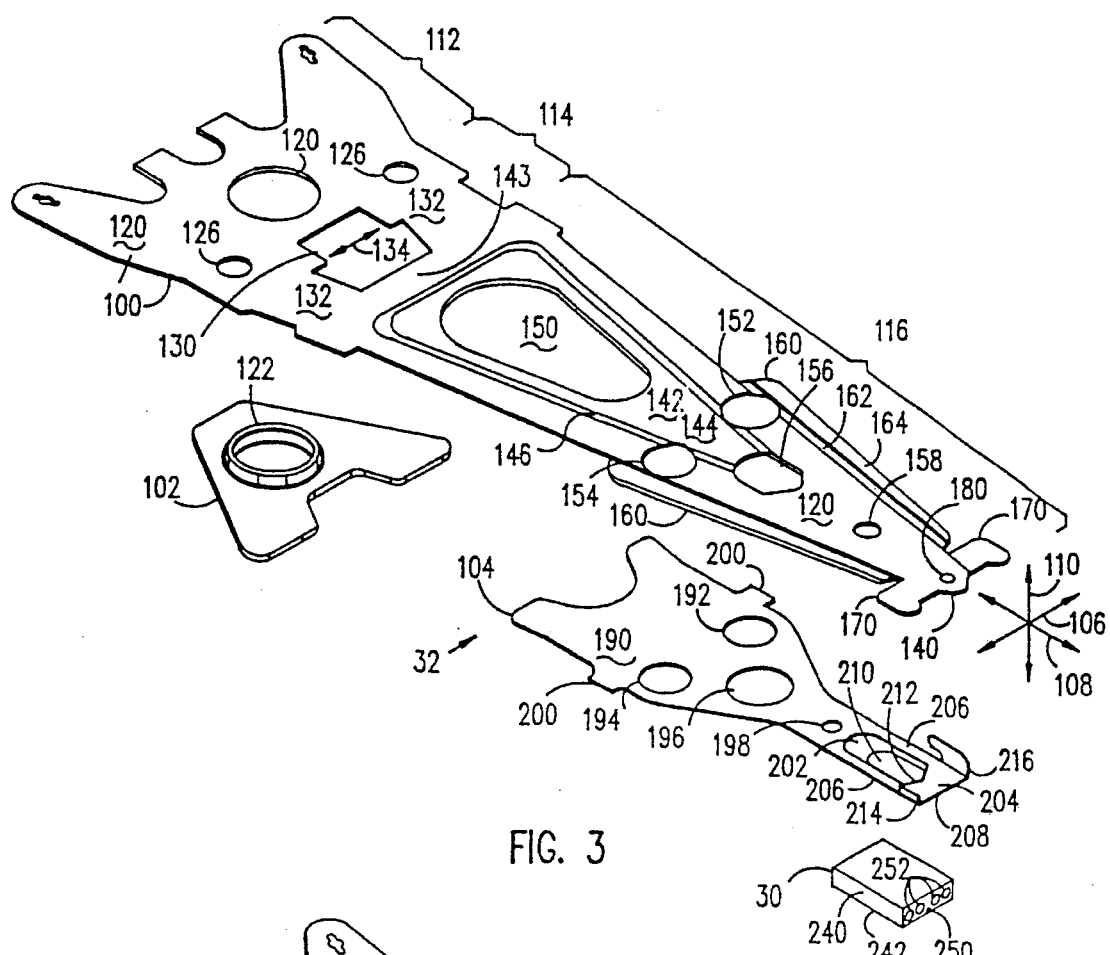
FIG. 3 is an exploded view the suspension of the system of FIG. 1.
Figure 4:
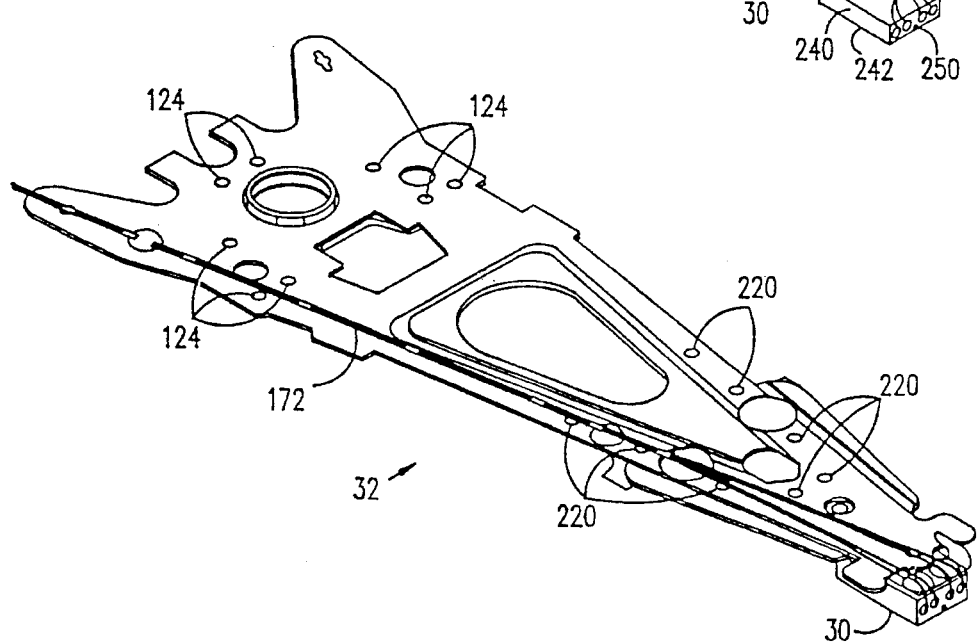
FIG. 4 is a top perspective view of the suspension of FIG. 3.

FIG. 3 shows an exploded view and FIG. 4 shows a top perspective view of the head 30 and suspension 32. Suspension 32 comprises a load beam 100, a mount plate 102 and a flexible or flexure member 104. Beam 100, mount plate 102, and flexure 104 are formed by photolithographic etch processes. The parts are then stamped to form the elevation changes and bends in the material. Beam 100 has a longitudinal axis 106, a lateral axis 108, and a vertical axis 110. The load beam 100 may be made of a thin sheet material. Stainless steel may be used with a thickness of between 0.0381 and 0.0762 mm and preferably 0.0635 mm. The main portion of beam 100 comprises a contiguous surface 120 of a single elevation.

Load beam 100 has a mount plate section 112, a spring section 114, and a rigid section 116. The mount plate section 112 has an aperture 120 which is sized to receive a swage spud 122 of mount plate 102. Mount plate 102 may be made of stainless steel of a thickness between 0.1 and 0.4 mm and preferably 0.2 mm. Mount plate 102 is welded to beam 100 at weld spots 124. The spud 122 passes through aperture 120 and into an aperture on the corresponding actuator arm 34. The spud 122 is then swaged. The result is that the load beam 100 is securely attached to arm 34 by being sandwiched between the arm 34 and mount plate 102. Although swaging is the preferred method of attaching beam 100 to arm 34, other methods such as welding, cementing, or using fasteners, may also be used. If such alternative attachment methods are used, then plate 102 may be eliminated.

Mount plate section 112 has a pair of stamped round dimples 126 which extend upward from surface 120. These dimples 126 are located outside the vertical periphery of arm 34 when mount plate 102 is swaged to arm 34. In the event that the suspension 32 must be removed from the arm 34 after swaging, dimples 126 act as an unlocking mechanism. The load beam 100 is rotated one way or the other around the swage hole 120. One or the other of dimples 126 will then engage the outer edge of arm 34 and act as a lever to pop the swage spud 122 out of the swage hole in the arm 34.

Spring section 114 has an aperture 130 which is flanked by two spring legs 132. Spring section 114 allows beam 100 to bend about an axis 134. The bending is necessary to load the head 30 to its proper flying height above the disk.

Rigid section 116 extends from the spring section 114 to a distal end 140 of beam 100. Section 116 has an elongated raised portion 142 which extends above surface 120. A small transition area 143 is located between spring section 114 and raised section 142 to prevent distortion of the beam 100 during manufacture. Raised portion 142 has a flat top section 144 which is parallel to surface 120 and a surrounding sloping wall section 146 which connects top section 144 to surface 120. Raised portion 142 is elongated in shape and is centered along and runs in the direction of longitudinal axis 106. The length of raised portion 142 is preferably equal to or greater than 50% of the length of the rigid section 116. Raised portion 142 is formed by a stamping process. In order to avoid distortion of beam 100 during the stamping process it is preferable that wall section 146 have a low slope. Preferably the slope (distance of vertical height/distance of horizontal run) is less than or equal to 0.75 and is preferably 0.5.

Section 116 also has a plurality of tooling apertures 150, 152, 154, 156 and 158. These tooling apertures allow for ease of alignment and centering of the parts of the suspension during manufacture. These apertures are optional and may be eliminated.

Rigid section 116 also has a pair of outside edge flanges 160. The flanges 160 are each formed with a sloping wall section 162 and a top flat section 164 which is parallel to surface 120. The flanges laterally overlap with raised portion 142 for a short distance along the length of axis 106. The flanges 160 extend from the raised portion 142 to a position proximate the distal end 140. The flanges 160 are formed by a stamping process.

The inventors have discovered an additional benefit of tooling holes 152 and 154. These holes are located in the region of rigid section 116 where the raised portion 142 and flanges 160 overlap along a lateral cross sectional plane. The region around holes 152 and 154 is not as rigid as other portions of section 116. This allows for a slight torsional pivot between the section having portion 142 and the section having flanges 160. The result is that there is a reduced lateral shift at the head 30 at the end of the suspension. This slight decoupling of the raised portion 142 and flanges 160 allows for a cancellation of lateral movement. The rotational inertias of the raised portion 142 and the flanges 160 are such that together they form a tuned damper which minimizes the first torsional gain.

Raised portion 142 and flanges 160 both provide rigidity to the beam 100. It is important that rigid section 116 have at least one or the other of raised portion 142 or flanges 160 along its length. Alternatively, flanges 160 may be eliminated and raised section 142 extended to a position proximate the distal end 140.

The distal end 140 has a pair of hammer head tabs 170 which are used to align the suspensions during assembly. A downward extending round dimple 180 is position proximate the center of distal end 140.

Flexure member 104 is preferably made of a thin sheet material. Stainless steel may be used having a thickness of between 0.0203 and 0.0381 mm and preferably 0.0254 mm. The member 104 is shaped to fit substantially within the vertical periphery of beam 100. The flexure 104 has a surface 190. The flexure 104 has tooling apertures 192, 194, 196 and 198 which correspond to apertures 152, 154, 156 and 158 of beam 100. These tooling apertures are also optional. Flexure 104 has a pair of finger tabs 200 which extend beyond the vertical periphery of beam 100 and may be used to position the flexure 104 during manufacture.

Flexure 104 has a flexure aperture 202 near its distal end 204. The aperture 202 is flanked by two flexure legs 206. An end section 208 is connected to the ends of legs 206. A tongue section 210 extends from end section 208 into aperture 202. The tongue section 210 has a bend section 212 which comprises two parallel bend lines which are in the shape of "v" or chevron pattern. The tongue 210 is parallel to the surface 120 of beam 100 but is displaced below the surface 190 of flexure 104.

The flexure 104 has a perpendicular tab 214 and a perpendicular tab 216 which help to align the wires 172. Tab 216 is hook shaped in order to engage the outer of distal end 140 of beam 100. This hook acts as a limiter to ensure that flexure 104 does not displace vertically too great a distance from beam 100.

Flexure 104 is attached to beam 100 preferably by welding at welding spots 220. Head 30 is attached to tongue section 210 of flexure 104 preferably by cement or other suitable attachment methods. Dimple 180 is positioned such that it engages tongue section 210 along a vertical line which passes through approximately the center of gravity of head 30.

Head 30 comprises an air bearing slider 240 having an air bearing surface 242. Other types of fluid bearing sliders may also be used. A transducer element 250 is mounted on slider 240 and is electrically connected (not shown) to connection pads 252. Wires 172 are connected to pads 252 (preferably by solder) and extend over section 204 and distal end 140 and back toward the rear of the suspension 32. The wires 172 are then electrically connected to the rest of system 10. The wires 172 are attached to suspension 32 by epoxy or other suitable attachment methods.

Figure 5:
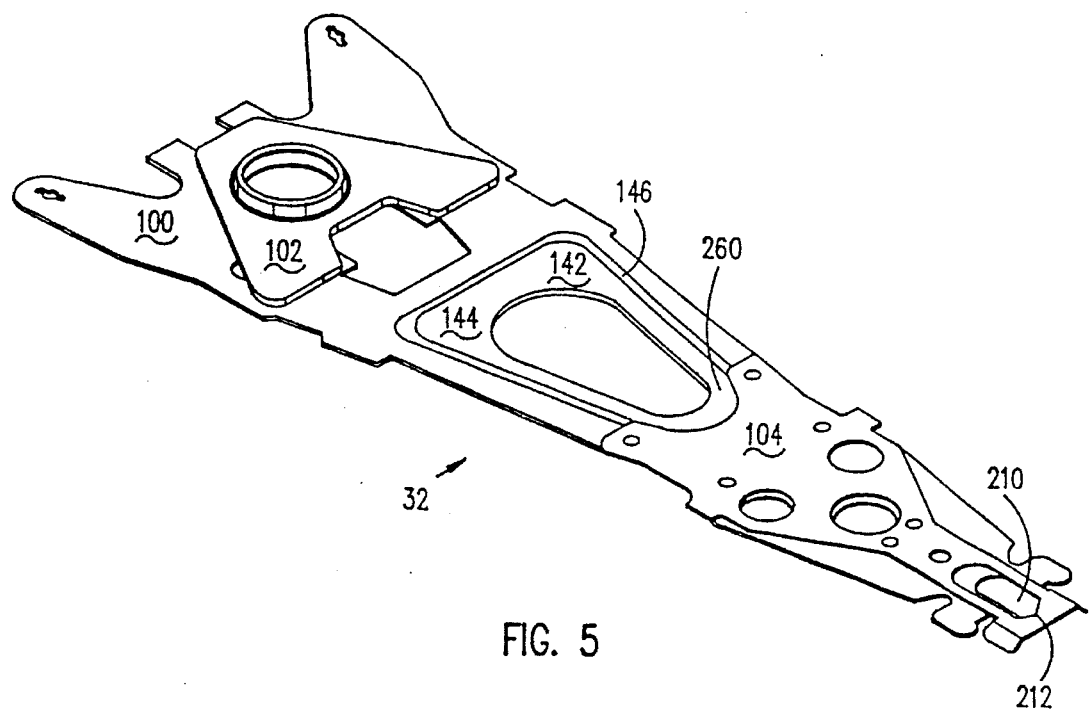
FIG. 5 is a bottom perspective view of the suspension of FIG. 3.

FIG. 5 shows a bottom perspective view of suspension 32. Raised portion 142 forms a recessed concave section 260 in the beam 100. Flexure 104 partially encloses this concave section 260. The result is a partial box section which adds rigidity to the structure. The box is fully enclosed around a lateral transversal cross sectional plane. The lateral cross sectional plane is a plane which is perpendicular to the longitudinal axis 106. The inventors have discovered an additional benefit of the design of the present suspension. The amount of rigidity or stiffness in the suspension may be easily adjusted by varying the length of the flexure 104. When maximum rigidity is required, flexure 104 is made of a length such that it completely covers concave section 260. When less rigidity is required, the flexure length and the length of the formed box section may be reduced. However, it is preferred that at least some portion of the concave section 260 be covered by a portion of flexure 104 such that a box section is formed along at least one lateral cross sectional plane.

Figure 6:
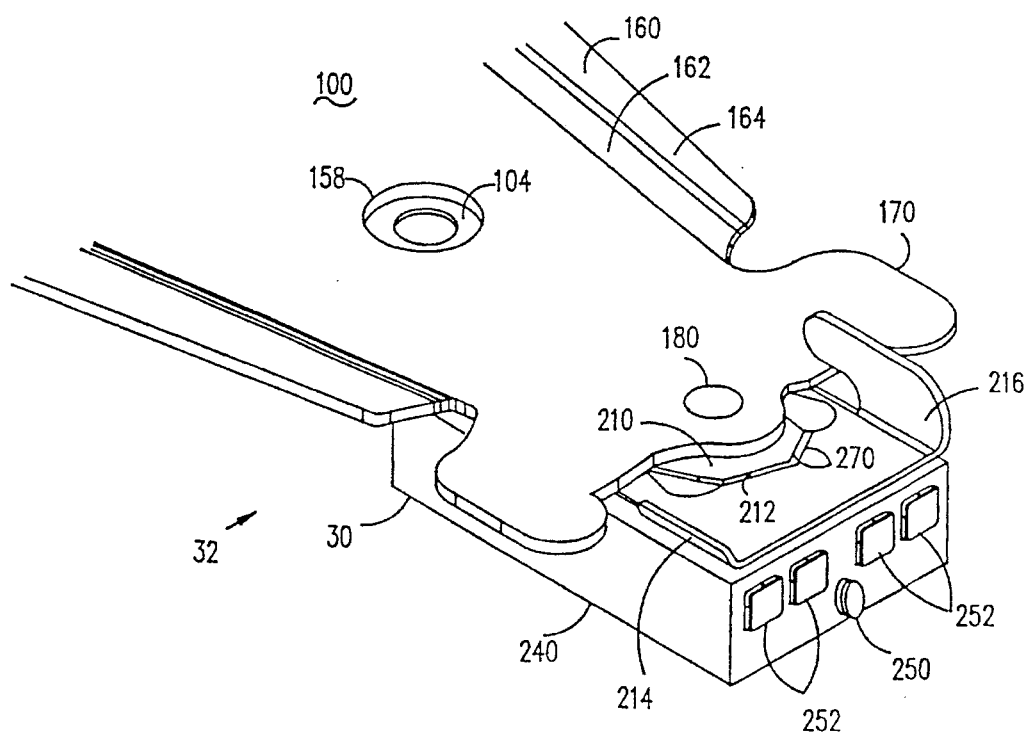
FIG. 6 is a close-up view of a portion of the suspension of FIG. 3.

FIG. 6 shows a detailed perspective view of the end of suspension 32. The wires 172 have been omitted to provide a better view. Note the bend section 212 which is comprised of two "v" shaped bend lines 270.

Figure 7:
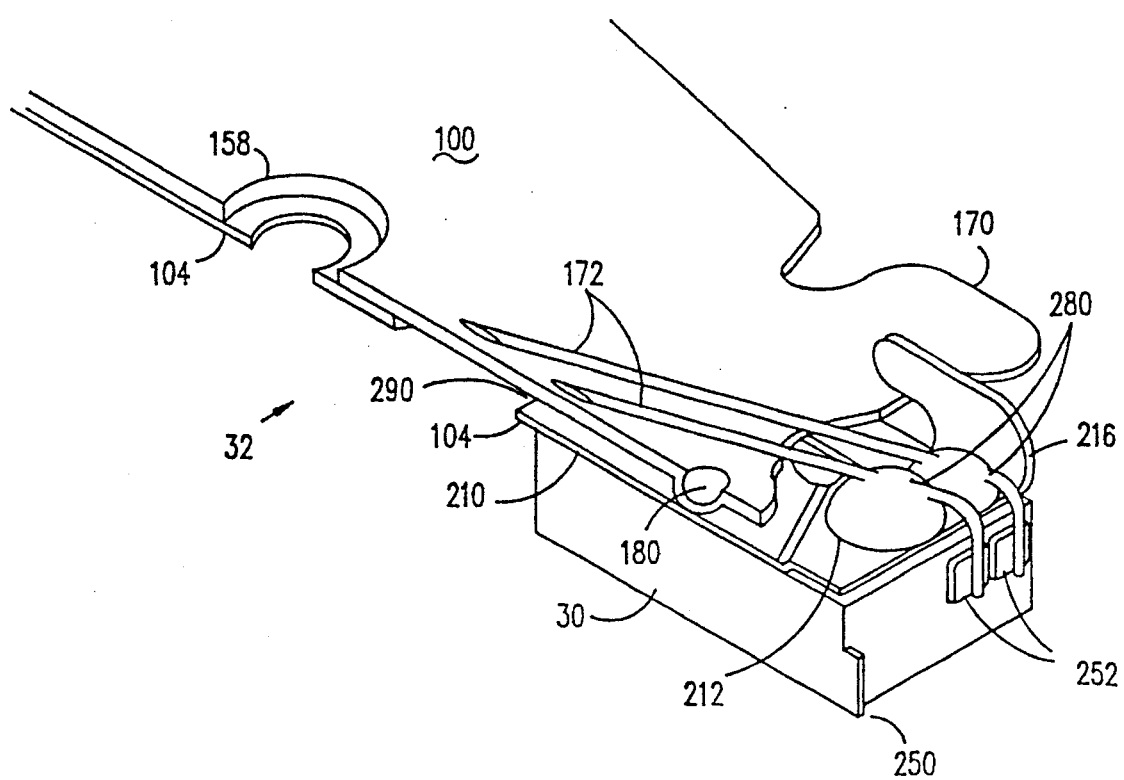
FIG. 7 is a cross sectional view of a portion of the suspension of FIG. 3.

FIG. 7 shows a detailed cross sectional view of the end of suspension 32. The wires 172 are shown with epoxy balls 280 which attach the wires 172 to flexure member 104. Also note the tongue 210 is offset a vertical distance below the rest of flexure 104 such that a vertical gap 290 is formed between beam 100 and tongue 210. This gap 290 allows the tongue 210 and head 30 to pivot about dimple 180 without interference.

The operation of suspension 32 may now be understood. Mount plate 102 provides a secure and solid swage attachment of the suspension 32 to arm 34. Spring section 114 allows the beam 100 to bend along line 134 to position head 30 at the proper elevation above the disk 12. The raised portion 142 in combination with the flexure member 104 forms a box section which gives the beam 100 great rigidity. This rigidity is achieved in a very low profile height. The low profile allows for smaller disk spacing and allows for more disks per drive. Additional stiffness is provided by flanges 160. These flanges 160 have both a side wall section 162 and a top section 164. Each flange therefore has two bend lines. These two bend lines give the flange great stiffness in a very low profile height. A single vertical flange of the prior art requires greater height to achieve the same stiffness.

The flexure 104 in combination with dimple 180 allows head 30 to gimbal (pitch and roll) to achieve the proper orientation. However, the "v" shaped bend lines of section 212 ensure that tongue 210 and head 30 will always be approximately parallel to beam 100. This is an important requirement because improper orientation of the head 30 may make it impossible to read and write data from the disk 12. In addition, tab 216 prevents flexure 104 from bending to-far away from beam 100.

The suspension 32 is relatively inexpensive to manufacture. The main part of suspension 32 has only two main parts, the load beam 100 and flexure 104. Flexure 104 does double duty by acting as the bottom side of the box structure as well as providing the gimbal assembly for the head 30.

Figure 8:
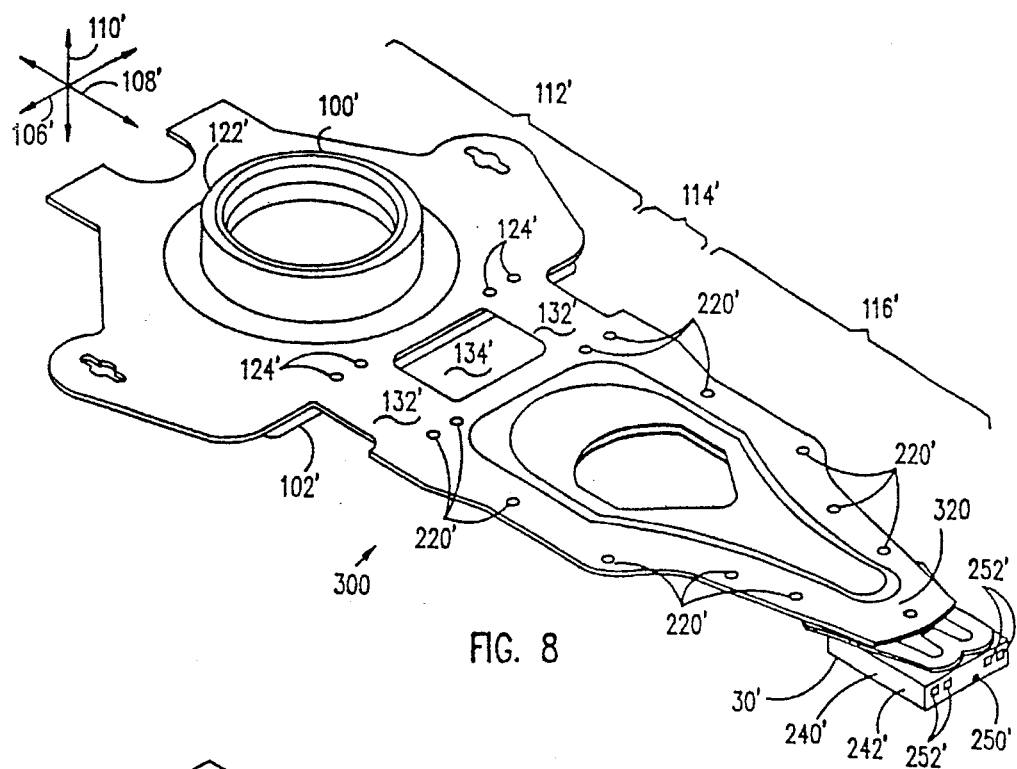
FIG. 8 is a top perspective view of an alternative embodiment of the suspension of the present invention.
Figure 9:
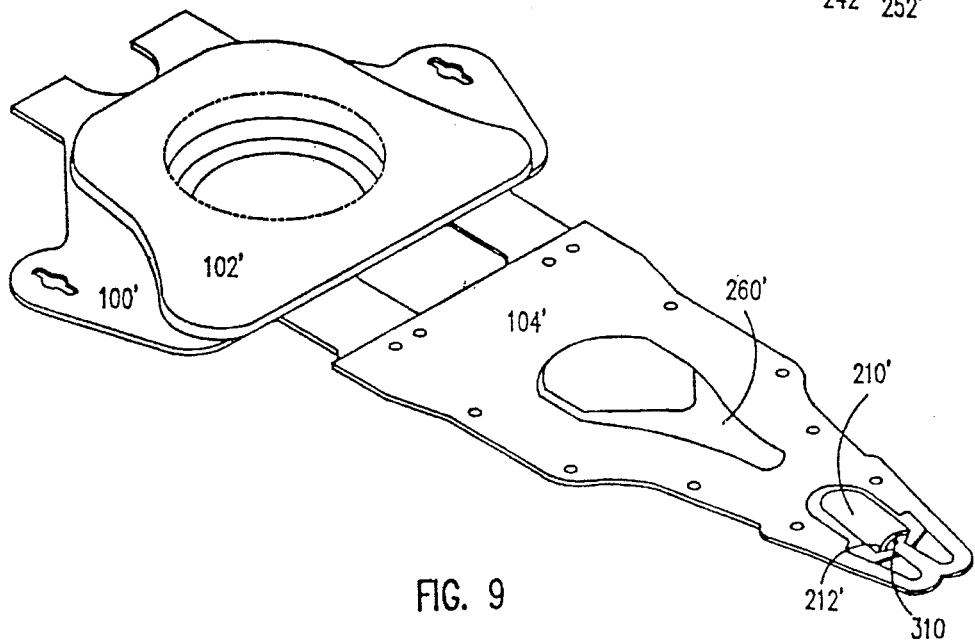
FIG. 9 is a bottom perspective view of the system of FIG. 7.

FIGS. 8 and 9 show top and bottom perspective views, respectively, of an alternative embodiment of the suspension of the present invention which is designated by the general reference number 300. Elements of suspension 300 which are similar to elements of suspension 32 are designated by prime number. Suspension 300 may be substituted for suspension 32 in system 10.

Suspension 300 is shorter in length then suspension 32 and is designed for use in smaller disk drives and drives which may experience higher acceleration levels that produce head disk separation. Suspension 300 varies from suspension 32 in that the raised portion 142' extends along almost the entire length of rigid section 116'. The flexure 104' is sized such that the concave 260' is completely covered. Flanges are not needed in this case.

Dimple 180' engages tongue 210' at a point 310. Note that in this case dimple 180' does not engage tongue 210' at the lower elevation of tongue 210'. Instead, dimple 180' engages the tongue 210' before the bend section 212'. The dimple does not have to extend downward as far as in suspension 32 and so the stamped dimple 180' may be of a smaller diameter. The head 30' is attached to tongue 210' such that its center of gravity is directly below dimple 180'. A small transition area 320 should be left between raised portion 142' and dimple 180' of sufficient length to prevent distortion of beam 100 during the manufacturing process.

Figure 10:
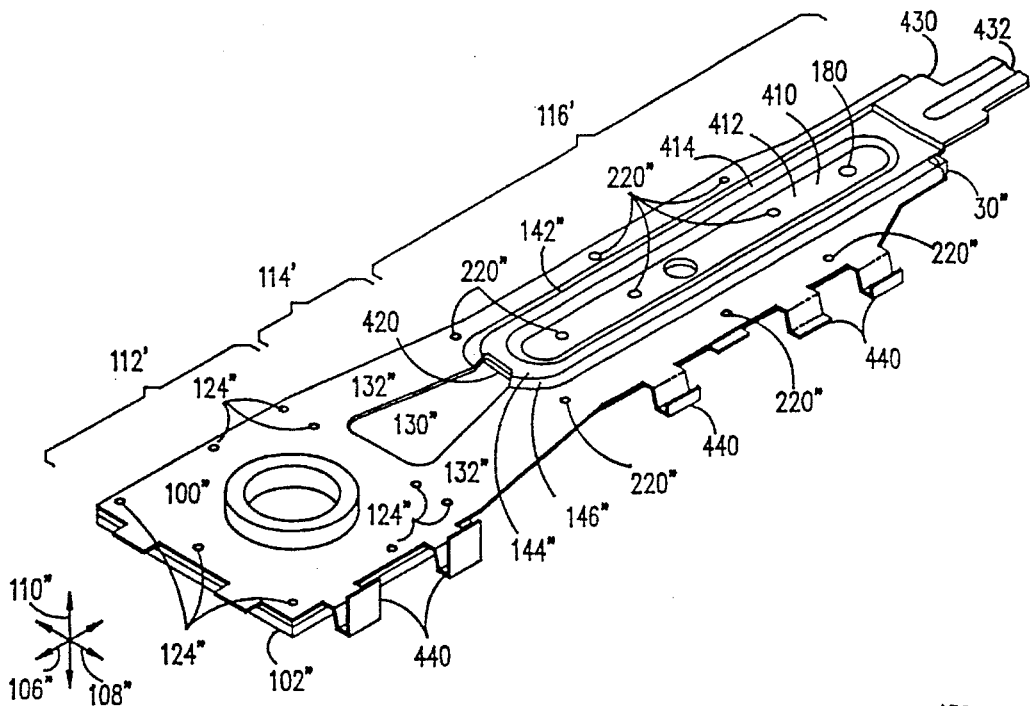
FIG. 10 is a top perspective view of an alternative embodiment of the suspension of the present invention.
Figure 11:
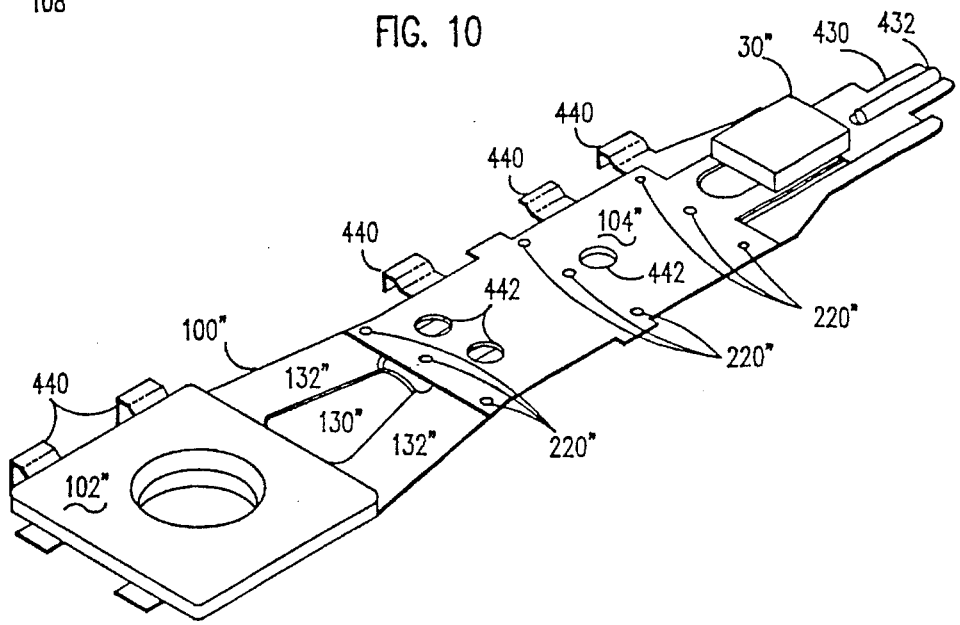
FIG. 11 is a bottom perspective view of the suspension of FIG. 10.

FIGS. 10 and 11 show perspective top and bottom views, respectively, of an alternative embodiment of the suspension of the present invention which is designated by the general reference number 400. Elements of suspension 400 which are similar to elements of suspension 32 are designated by prime number. Suspension 400 may be substituted for suspension 32 in system 10.

Suspension 400 has a raised portion 142" with a top section 144" and a wall section 146". In addition, raised portion 142" has a central depressed region 410 having a flat bottom section 412 and a side wall section 414 which connects bottom section 412 to top section 142". The bottom section 412 contacts and is welded to flexure 104". Flexure 104" completely encloses the cavity formed by raised portion 142". The raised portion 142" with depressed region 410 makes a very rigid section. The slopes of walls 146" may be relatively steep (0.75–1.0) because of the addition of a stress relief aperture 420. Aperture 420 allows the material of beam 100 to accommodate and compensate for stresses during the manufacturing process, thus preventing unwanted deformation.

Flexure 104" is similar to flexure 104. Dimple 180" is located within the depressed region 410 and extends down to engage the tongue section of flexure 104". By placing the dimple 180" within the depressed region 410, the rigid box formed by the raised portion 142" and flexure 104" is able to extend beyond the dimple 180". This extends the stiff portion of the suspension beyond the pivot point (dimple 180).

An optional load/unload tab 430 extends from beam 100. Tab 430 has a trough depression 432. The bottom of depression 432 is used to engage the ramp 80 of system 10.

Suspension 400 has a plurality of wiring tabs 440 which are used to hold the wires (not shown) which run from head 30" to the rest of system 10.

Flexure 104" has a plurality of drain holes 442. The holes 442 allow liquids to drain away during the manufacturing process.

While the preferred embodiments of the present invention have been illustrated in detail, it should be apparent that modifications and adaptation to those embodiments may occur to one skilled in the art without departing from the scope of the present invention as set forth in the following claims.

What is claimed is:

1. A transducer suspension system comprising:
   a load beam having a longitudinal axis, a lateral axis, and a perpendicular axis, a first and a second ends of the load beam being located on the longitudinal axis, the first end for connection to a support member, the load beam having a first and a second surfaces on opposite sides of the load beam, a raised section running along the longitudinal axis of the load beam and located between the first and second ends, the raised section forms an elevated portion on the first surface and a recessed portion on the second surface; and
   a flexible member connected to the load beam, a first end of the flexible member located on the side of the load beam having the second surface, the flexible member covering the recessed portion such that the load beam and the flexible member form an enclosed interior chamber along a cross sectional plane parallel to a plane containing the lateral and perpendicular axes, a second end of the flexible member having a mounting section for mounting a transducer assembly.

2. The system of claim 1, wherein the load beam has a spring section located between the first end and the raised section.

3. The system of claim 1, wherein the first surface of the load beam has a first planar section at a first elevation, the raised section comprises a wall section and top section, the top section having a planar surface parallel to the first planar section and being at a second elevation.

4. The system of claim 3, wherein the wall section has a slope (change in distance along a direction parallel to the perpendicular axis divided by change in distance along a direction parallel to a plane containing the lateral and longitudinal axes) of 0.75 or less.

5. The system of claim 1, wherein the second surface of the load beam has a first planar section, and the flexible member has a first planar section which is attached to the first planar section of the second surface of the load beam.

6. The system of claim 1, wherein the raised section has a stress relief aperture.

7. The system of claim 1, wherein the mounting section of the flexible member comprises an aperture, a tongue section extending into the aperture, the tongue section having a first and second bend lines such that the tongue section is offset at a different elevation from the remainder of the flexible member, the bend lines being "v" shaped.

8. The system of claim 1, further comprising a transducer assembly connected to the mounting section of the flexible member.

9. The system of claim 8, wherein the transducer assembly comprises a fluid bearing slider and a magnetic transducer element.

10. The system of claim 1, wherein the load beam has a spring section connected between the first end of the load beam and the raised section, and the raised section has a length of at least one half the distance between the spring section and the second end of the load beam.

11. The system of claim 1, wherein the raised section has a depressed interior region which is in contact with the flexible member.

12. The system of claim 1, wherein the second end of the flexible member has a tab member which extends from the flexible member located on the second side of the load beam around an edge of the second end of the load beam, to the first side of the load beam, the tab member limiting the displacement of the flexible member along a direction parallel to the perpendicular axis.

13. The system of claim 1, wherein the raised section is an elongated stamped section.

14. The system of claim 1, wherein the load beam has a flange section which overlaps the raised section along a plane parallel to the lateral and perpendicular axes.

15. The system of claim 1, wherein the load beam and the flexible member are both formed from planar sheets of metal.

16. A transducer suspension system comprising: a load beam having a longitudinal axis, a lateral axis, and a perpendicular axis, a first and a second ends of the load beam being located on the longitudinal axis, the first end for connection to a support member, the load beam having a first and a second, surfaces on opposite sides of the load beam, a raised section running along the longitudinal axis of the load beam and located between the first and second ends, the raised section forms an elevated portion on the first surface and a recessed portion on the second surface; and a flexible member connected to the load beam, a first end of the flexible member located on the side of the load beam having the second surface, the flexible member covering the recessed portion such that the load beam and the flexible member form an enclosed interior chamber along a cross sectional plane parallel to a plane containing the lateral and perpendicular axes, a second end the flexible member having a mounting section for mounting a transducer assembly;

a transducer assembly connected to the mounting section of the flexible member;

a data storage disk located proximate to the transducer assembly;

a rotation device connected to the disk for rotating the disk; and a movement device connected to the first end of the load beam for moving the transducer assembly relative to the disk.

17. The system of claim 16, wherein the load beam has a spring section located between the first end and the raised section.

18. The system of claim 16, wherein the first surface of the load beam has a first planar section at a first elevation, the raised section comprises a wall section and top section, the top section having a planar surface parallel to the first planar section and being at a second elevation.

19. The system of claim 18, wherein the wall section has a slope (change in distance along a direction parallel to the perpendicular axis divided by change in distance along a direction parallel to a plane containing the lateral and longitudinal axes) of 0.75 or less.

20. The system of claim 16, wherein the second surface of the load beam has a first planar section, and the flexible member has a first planar section which is attached to the first planar section of the second surface of the load beam.

21. The system of claim 16, wherein the raised section has a stress relief aperture.

22. The system of claim 16, wherein the mounting section of the flexible member comprises an aperture, a tongue section extending into the aperture, the tongue section having a first and second bend lines such that the tongue section is offset at a different elevation from the remainder of the flexible member, the bend lines being "v" shaped.

23. The system of claim 16, wherein the transducer assembly comprises a fluid bearing slider and a magnetic transducer element.

24. The system of claim 16, wherein the load beam has a spring section connected between the first end of the load beam and the raised section, and the raised section has a length of at least one half the distance between the spring section and the second end of the load beam.

25. The system of claim 16, wherein the raised section has a depressed interior region which is in contact with the flexible member.

26. The system of claim 16, wherein the second end of the flexible member has a tab member which extends from the flexible member located on the second end of the load beam around an edge of the second end of the load beam, to the first side of the load beam, the tab member limiting the displacment of the flexible member along a direction parallel to the perpendicular axis.

27. The system of claim 16, wherein the raised section is an elongated stamped section.

28. The system of claim 16, wherein the load beam has a flange section which overlaps the raised section along a plane parallel to the lateral and perpendicular axes.

29. The system of claim 16, wherein the load beam and the flexible member are both formed from planar sheets of metal.

* * * * *

UNITED STATES PATENT AND TRADEMARK OFFICE
CERTIFICATE OF CORRECTION

PATENT NO. : 5,570,249
DATED : October 29, 1996
INVENTOR(S) : Akihiko Aoyagi and Oscar J. Ruiz It is certified that error appears in the above-indentified patent and that said Letters Patent is hereby corrected as shown below:

In column 10, line 16, delete "end", and substitute with --side--.

Signed and Sealed this

Eleventh Day of November, 1997

Attest:

BRUCE LEHMAN

*Attesting Officer*        *Commissioner of Patents and Trademarks*